United States Patent
Yan

(10) Patent No.: US 6,531,824 B1
(45) Date of Patent: Mar. 11, 2003

(54) UNIVERSAL ELECTRONIC PLUG-IN REPLACEABLE FLUORESCENT LAMP BALLAST AND ADAPTER

(75) Inventor: Ellis Yan, South Russell, OH (US)

(73) Assignee: Technical Consumer Products, Inc, Aurora, OH (US)

( * ) Notice: Subject to any disclaimer, the term of this patent is extended or adjusted under 35 U.S.C. 154(b) by 74 days.

(21) Appl. No.: 09/666,323

(22) Filed: Sep. 21, 2000

(51) Int. Cl.⁷ ................................................. H01J 13/46
(52) U.S. Cl. ............................ 315/58; 315/56; 362/260
(58) Field of Search ............................. 315/56, 58, 62, 315/57, 71, 72, 362; 362/260, 216, 431

(56) References Cited

U.S. PATENT DOCUMENTS

| | | | |
|---|---|---|---|
| 3,742,208 A | 6/1973 | Mills | 240/51.72 |
| 4,029,953 A | 6/1977 | Natoli | 240/8.16 |
| 4,969,070 A * | 11/1990 | Costa | 362/221 |
| 5,073,845 A | 12/1991 | Aubrey | 362/226 |
| 5,128,590 A | 7/1992 | Holzer | 362/58 |
| 5,130,915 A | 7/1992 | Lerch | 362/367 |
| 5,189,339 A * | 2/1993 | Peshak | 315/58 |
| 5,320,547 A | 6/1994 | Mews | 439/227 |
| 5,455,484 A * | 10/1995 | Maya et al. | 315/58 |
| 5,491,618 A | 2/1996 | Vakil | 362/147 |
| 5,707,143 A | 1/1998 | Hentz | 362/365 |
| 5,788,533 A | 8/1998 | Alvardo-Rodrigues | 439/441 |
| 6,390,646 B1 * | 5/2001 | Yan | 362/260 |

* cited by examiner

Primary Examiner—Don Wong
Assistant Examiner—Jimmy T. Vu
(74) Attorney, Agent, or Firm—Joseph H. Taddeo

(57) ABSTRACT

The present invention relates to a novel energy efficient, universal replaceable electronic ballast, using compatible adapters, for use in fluorescent lighting fixtures and/or table/floor lamps. This novel energy efficient, universal replaceable electronic ballast comprises a family of electronic ballasts for use with currently available fluorescent lamps; the first being a Circlelite lamp, the second, a compact SpringLamp, the third, either a double or triple biaxial compact fluorescent lamp, and the fourth, a 2D fluorescent lamp. Additionally, these electronic ballasts are available in either an instant start (IS) or a rapid start (RS) designs. It is advantageous to use these universal ballasts with the aforementioned fluorescent lamps because of their increased longevity, typically 9,000 to 10,000 hours, their reduced operating costs and energy efficiencies. Additionally. there are five newly designed families of adapters that are compatible with the universal plug-in electronic ballasts. The first adapter is designed for use with a low profile lighting fixtures having a tabbed base that is secured using two self-tapping screws or rivets, the second adapter for use with a low profile lighting fixtures having a twist-lock mounting base, and a third adapter for use with a low profile fixture having a screw-lock type base. A fourth adapter, having a local switch operating capability, gives height to a table or floor lamp for a coordinated appearance with its accoutrement lampshade. The fifth adapter, having a remote switch operating capability, also gives height to a table or floor lamp for a coordinated appearance with its accoutrement lampshade.

21 Claims, 16 Drawing Sheets

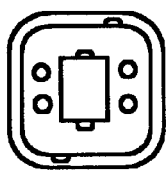
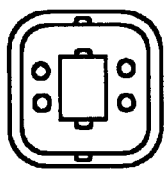
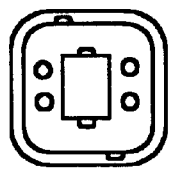
8 A          8 B          8 C
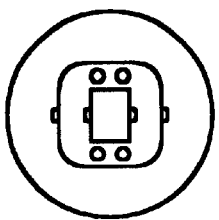
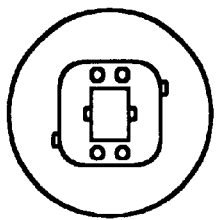
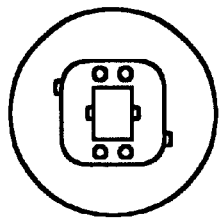
8 D          8 E          8 F
*Figs. 8A-F*

UNIVERSAL ELECTRONIC PLUG-IN REPLACEABLE FLUORESCENT LAMP BALLAST AND ADAPTER

FIELD OF THE INVENTION

The present invention relates primarily to a replaceable fluorescent lamp ballast, and more particularly to a universal plug-in replaceable fluorescent lamp electronic ballast that can be replaced without the need of dismantling the installed fixture or table/floor lamp. The present invention also relates to a lighting fixture ballast adapter and an illumination source support apparatus having an engaging component that is insertable into a recess and being rotatable therein for attachment.

BACKGROUND OF THE INVENTION

Present day fluorescent lighting fixtures have a ballasting arrangement where the ballast is an integral part of a fluorescent lighting fixture or fluorescent table/floor lamp. These electronic ballasts do not have a life expectancy greater than the fluorescent lamps themselves; their mean-time-between-failures (MTBF) is substantially smaller. In which case, when a ballast failure occurs, it may become necessary to have someone, such as a licensed electrician, replace the ballast by removing and dismantling the fixture or by dismantling the table/floor lamp.

To obviate the need for a skilled technician to replace or repair an existing ballast, the present invention fulfils this need.

The following prior art discloses the various aspects in the design and use of fluorescent lamp ballasts and their application.

U.S. Pat. No. 3,742,208, granted Jun. 26, 1973, to A. Mills, discloses a lighting fixture that utilizes one or more circular fluorescent lamps that is connectable to conventional screw-in or bayonet type sockets. A pair of upper and lower housing members provides a supporting enclosure for the ballast and starter components.

U.S. Pat. No. 4,029, 593, granted Jun. 14, 1977, to R. A. Natoli, teaches of a twist lock lamp socket locking means that comprises a lamp socket and panel assembly that includes a socket panel opening having a plurality of equally spaced radially outwardly directed retention slots therein that receive a plurality of circumferentially spaced socket retention tabs on a lamp socket. The socket is rotatably locked in position on the panel using a spring-biased tab located at the end of each ramped surface that engages with retention slots on the panel surface.

U.S. Pat. No. 5,073,845, granted Dec. 17, 1991, to T. R. Aubrey, teaches a retrofit unit for replacing conventional incandescent light bulbs with fluorescent or similar light sources. A hard-wired ballast is used in conjunction with conventional light fixtures to permit retrofit conversion.

U.S. Pat. No. 5,128,590, granted Jul. 7, 1992, to W. Holzer, discloses a compact fluorescent lamp and an electronic ballast that is constructed as a separate unit, which constituting an adapter, is electrically and mechanically connectable with the lamp by means of a plug-in connection. The plug-in connection between the ballast and the lamp extends in the direction of the lamp at least partially into the space surrounded by the lamp to achieve the smallest possible length.

U.S. Pat. No. 5,130,915, granted Jul. 14, 1992, to D. W. Lerch, discloses a dome shaped decorative fixture that is marketed in kit form with its individual components easily assembled or disassembled. The dome shaped decorative lighting fixture has been designed to be mounted in a ceiling either below a skylight and/or within a housing built into the ceiling.

U.S. Pat. No. 5,320,547, granted Jun. 14, 1994, to H. P. Mews, et al., discloses a lamp socket for a fluorescent lamp that permits insertion and removal of a fluorescent lamp in and from a socket, the socket being formed within a body and having an engagement surface wall from which a shelf projects.

U.S. Pat. No. 5,401,618, granted Feb. 13, 1996, to U. Vakil, discloses a quick connect/disconnect lighting fixture that requires no tools to install or remove after the initial installation. A typical consumer is then able to convert an existing incandescent lighting fixture to a fluorescent light fixture and maintain it after it is installed.

U.S. Pat. No. 5,707,143, granted Jan. 13, 1998, to J. A. Hentz, teaches of a pull-on clip that is manually assembled to a down lighting reflector trim in a snap-fitting manner. The pull-on clip facilitates positive lamp positioning, thereby providing a clean appearance.

U.S. Pat. No. 5,788,533, granted Aug. 4, 1998, to B. Alvardo-Rodriques, discloses an improved system of interconnecting ballasts and fluorescent lamps. The ballast circuit has wires running from the receptacles to the fluorescent lights.

Presently, the prior art teaches of fluorescent lamp sources of illumination that are supported by a tubular form, made from laminating two molded glass assemblies together. In several of the prior art, it is necessary to remove and dismantle the fixture, preferably by a skilled electrician, to replace the defective ballast. Other prior art teaches of retrofit fixtures that use hardwired ballasts that are mounted directly to the splice box of an existing fixture. Still other prior art disclose the use of candelabra based fluorescent lamps and bulbs as the illumination source.

The prior art recited above does not teach of the novel advantages that are found in the present invention.

What is needed is a universal replaceable electronic ballast, one that is universal in design, and one that can easily replaced by an inexperienced novice, without exposure to receiving an electrical shock. In this regard, the present invention fulfills this need.

SUMMARY OF THE INVENTION

The present invention relates to a novel energy efficient, universal replaceable electronic ballast, using compatible adapters, for use in fluorescent lighting fixtures and/or table/floor lamps.

This novel energy efficient, universal replaceable electronic ballast comprises a family of electronic ballasts for use with currently available fluorescent lamps; the first being a Circlelite lamp, the second, a compact SpringLamp, the third, either a double or triple biaxial compact fluorescent lamp, and the fourth, a 2D fluorescent lamp. Additionally, these electronic ballasts are available in either an instant start (IS) or a rapid start (RS) designs.

It is advantageous to use these universal ballasts with the aforementioned fluorescent lamps because of their increased longevity, typically 9,000 to 10,000 hours, and their reduced operating costs and energy efficiencies.

There is a dramatic energy cost savings of up to 75% when compared to an incandescent bulb having comparable light output. The extra long life of 9,000 to 10,000 hours is up to 13 times greater than a standard incandescent light bulb.

All fluorescent lamps operate more efficiently when driven at frequencies greater than 15 kilohertz. This efficiently improvement of 5–10% is one reason for the popularity of electronic ballasts.

The Circlelite is a circular fluorescent lamp, available in a 21-watt rating, has an initial light output of 1200 lumens. It mounts via a bat-wing type bracket or a straight-wing retainer bracket that snaps into place and is retained by two rectangular recesses in the top of the ballast housing.

The compact fluorescent lamp, a laterally twisted tube, more commonly referred to as a "SpringLamp" allows the shortest lamp known to the fluorescent lamp industry to be used. It provides for minimal light trapping, thereby creating the maximum concentrated lighting output, and lighting distribution that is closest to the illumination supplied by an incandescent bulb.

Typically, a 26-watt SpringLamp provides 1750 lumens of light output, which is 67.3 lumens per watt. This lamp provides a lighting output that slightly exceeds that of a standard conventional incandescent lamp—1750 lumens of the SpringLamp compared to 1710 lumens for an incandescent lamp, a 2.3 percent rated increase in lighting output.

The rated lamp life of the SpringLamp is 10,000 hours compared to the 750 hours of a standard incandescent bulb—a 13.3 fold improvement in the lamp longevity.

The double or triple biaxial compact fluorescent lamp is available in a range of sizes and wattages for innovative compact luminaries. The four-pin base is plugged into and retained by the universal electronic ballast.

The 2D fluorescent lamp is available in three select wattage ratings of 10, 16 and 28 watts. A larger 2D fluorescent lamp is available two wattage ratings of 21 and 39 watts. The 2D system is the highest output fluorescent lamp—the 39-watt system gives nearly the same light output of a 150-watt incandescent light bulb.

There are five families of newly designed adapters that are compatible with the universal plug-in electronic ballasts. The first adapter is designed for use with a low profile lighting fixtures having a tabbed base that is secured using two self-tapping screws or rivets, the second adapter for use with a low profile lighting fixtures having a twist-lock mounting base, and a third adapter for use with a low profile fixture having a screw-lock type base. A fourth adapter, having a local switch operating capability, gives height to a table or floor lamp for a coordinated appearance with its accoutrement lampshade. The fifth adapter, having a remote switch operating capability, also gives height to a table or floor lamp for a coordinated appearance with its accoutrement lampshade.

These adapters have a life expectancy of at least 40,000 hours, which is quadruple the life expectancy of most fluorescent lamps.

Accordingly, it is therefore an object of the present invention to provide a novel universal ballast that can be replaced easily, without the necessity for tools, by an inexperienced person.

It is another object of the present invention to provide a novel universal ballast that can be replaced easily, without the necessity for tools, by an inexperienced person, by unplugging the ballast from its adapter and replacing it with a substitute ballast.

It is still another object of the present invention to provide a novel universal ballast that receives and operates a circular fluorescent tube, more commonly referred to as a CircleLite lamp as the source of illumination.

It is still yet another object of the present invention to provide a novel universal ballast that receives and operates a compact, laterally twisted tube, fluorescent SpringLamp as the source of illumination.

Yet still, another object of the present invention is to provide a novel universal ballast that receives and operates either a double or a triple biaxial compact fluorescent lamp as the source of illumination.

Another object of the present invention is to provide a novel universal ballast that receives and operates a 2D fluorescent lamp as the source of illumination.

Still another object of the present invention is to provide a novel universal ballast and compatible adapter, that is designed for use with a low profile lighting fixtures having a tabbed base that is secured using two self-tapping screws or rivets.

Still yet, another object of the present invention is to provide a novel universal ballast and compatible adapter, that is designed for use with a low profile lighting fixtures having a twist-lock mounting base.

It is a further object of the present invention to provide a novel universal ballast and compatible adapter that is designed for use with a low profile fixture having a screw-lock type base.

It is still a further object of the present invention to provide a novel universal ballast and compatible adapter, that is designed for use in a table or floor lamp, to give height to a table or floor lamp for a coordinated appearance with its accoutrement lampshade, and having a local switch operating capability.

A final object of the present invention is to provide a novel universal ballast and compatible adapter, that is designed for use in a table or floor lamp, to give height to a table or floor lamp for a coordinated appearance with its accoutrement lampshade, and having a remote switch operating capability.

These, as well as other objects and advantages of the present invention will be better understood and appreciated upon reading the following detailed description of the preferred embodiment and it's alternative embodiments when taken in conjunction with the accompanying drawings.

BRIEF DESCRIPTION OF THE DRAWINGS

The present invention is pictorially illustrated in the accompanying drawings that are attached herein.

FIGS. 8A–8F detail six conventional lamp bases with their respective socket arrangements that can be used in an alternative embodiment for other styles and wattages of compact fluorescent lamps.

A detailed description of the invention follows, wherein the foregoing drawings are discussed in detail with call out nunmbers for each element.

DETAILED DESCRIPTION OF THE INVENTION

The present invention relates primarily to a novel universal plug-in replaceable fluorescent lamp electronic ballast that can be replaced without the need of dismantling the installed fixture or table/floor lamp. The present invention also relates to a lighting fixture ballast adapter and an illumination source support apparatus having an engaging component that is insertable into a recess and being rotatable therein for attachment.

Figure 1:
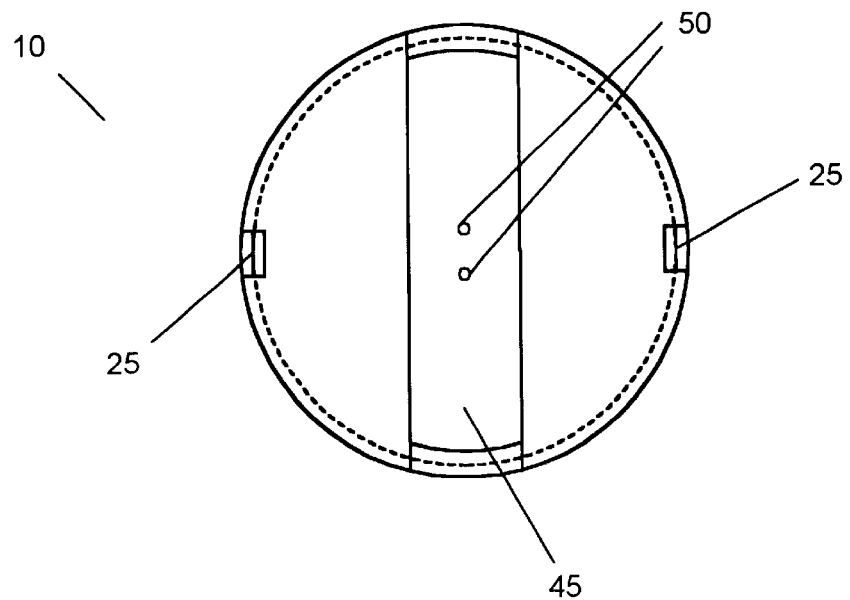
FIG. 1 is a top view of the universal plug-in electronic fluorescent lamp ballast
Figure 1A:
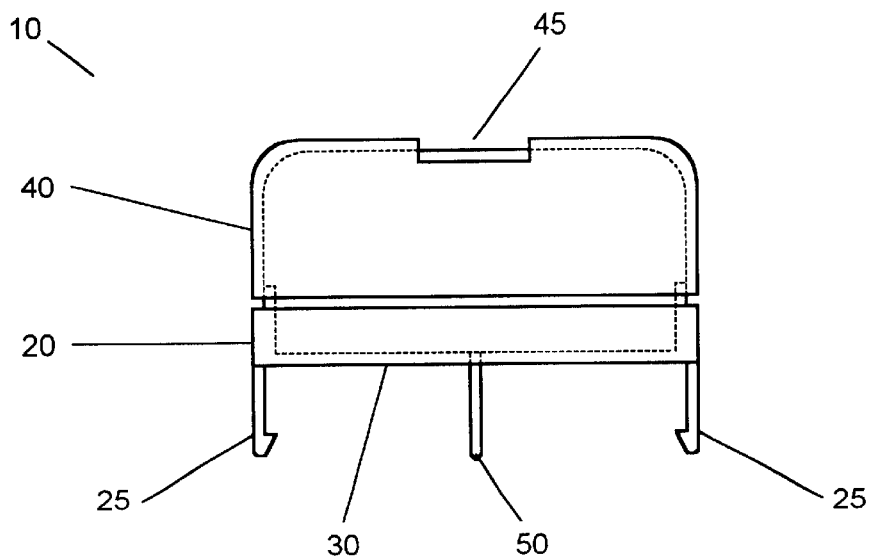
FIG. 1A is a side elevational view of the universal plug-in electronic fluorescent lamp ballast, having two retention tabs extending from the lower surface.

Referring now to FIGS. 1 and 1A, there is shown a top and side view, respectively of the newly designed universal plug-in replaceable fluorescent lamp electronic ballast 10. This novel plug-in electronic ballast is comprised of two basic subassemblies: a bottom housing 20 having two locking projections 25 extending from the lower surface 30 for engagement in its companion family of adapters, and a top housing 40, having a grooved channel 45 to receive an interlocking bat-wing support bracket 55, when used. The two gold-plated power pins 50, located at the bottom of the universal ballast, conduct the input power to the circuitry found within the universal modular ballast.

Figure 2:
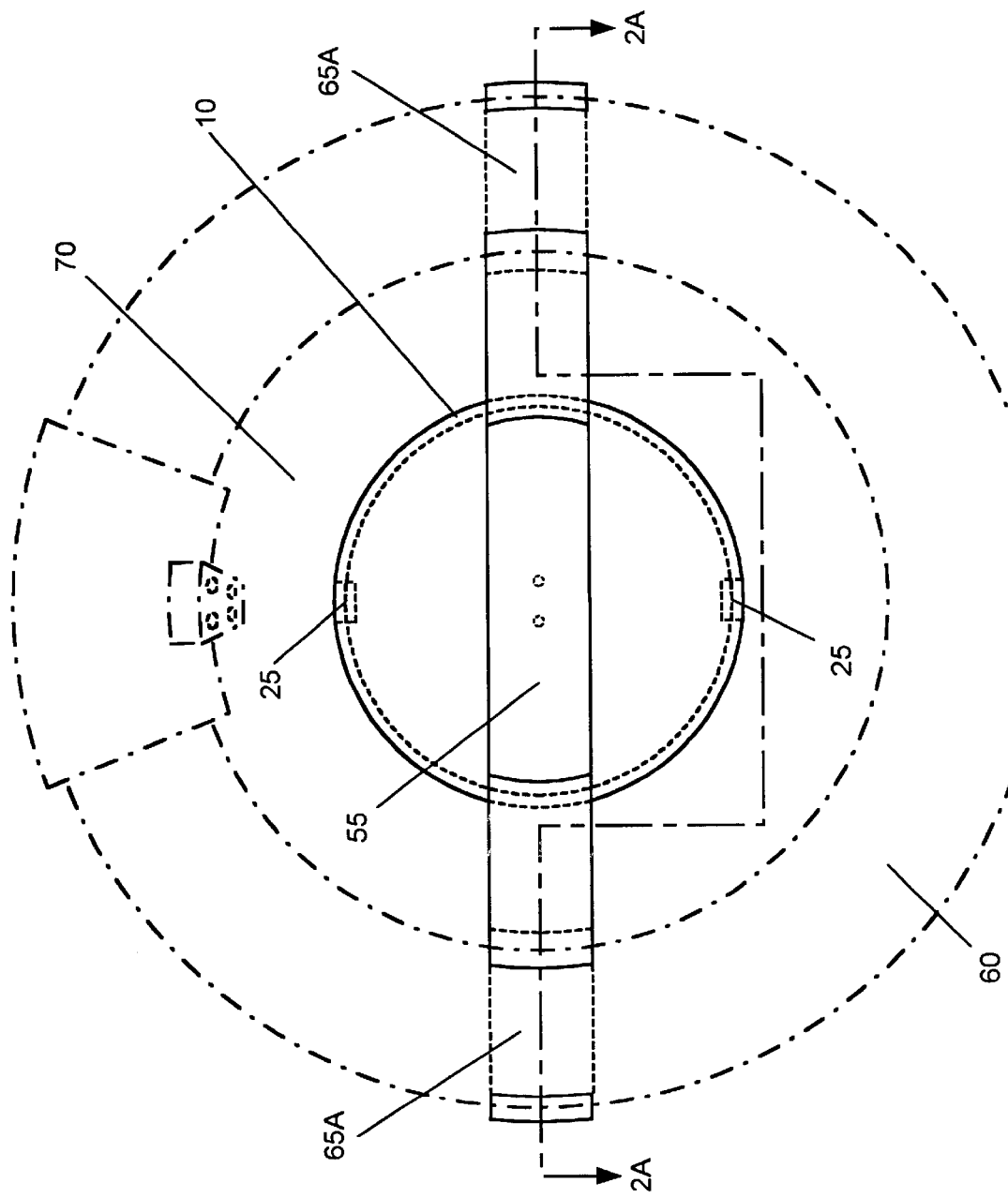
FIG. 2 is a top view, shown orthogonal to FIG. 1, of a first embodiment of the universal electronic fluorescent lamp ballast having a snap-fitted, bat-wing bracket that supports a circular fluorescent tubular lamp.
Figure 2A:
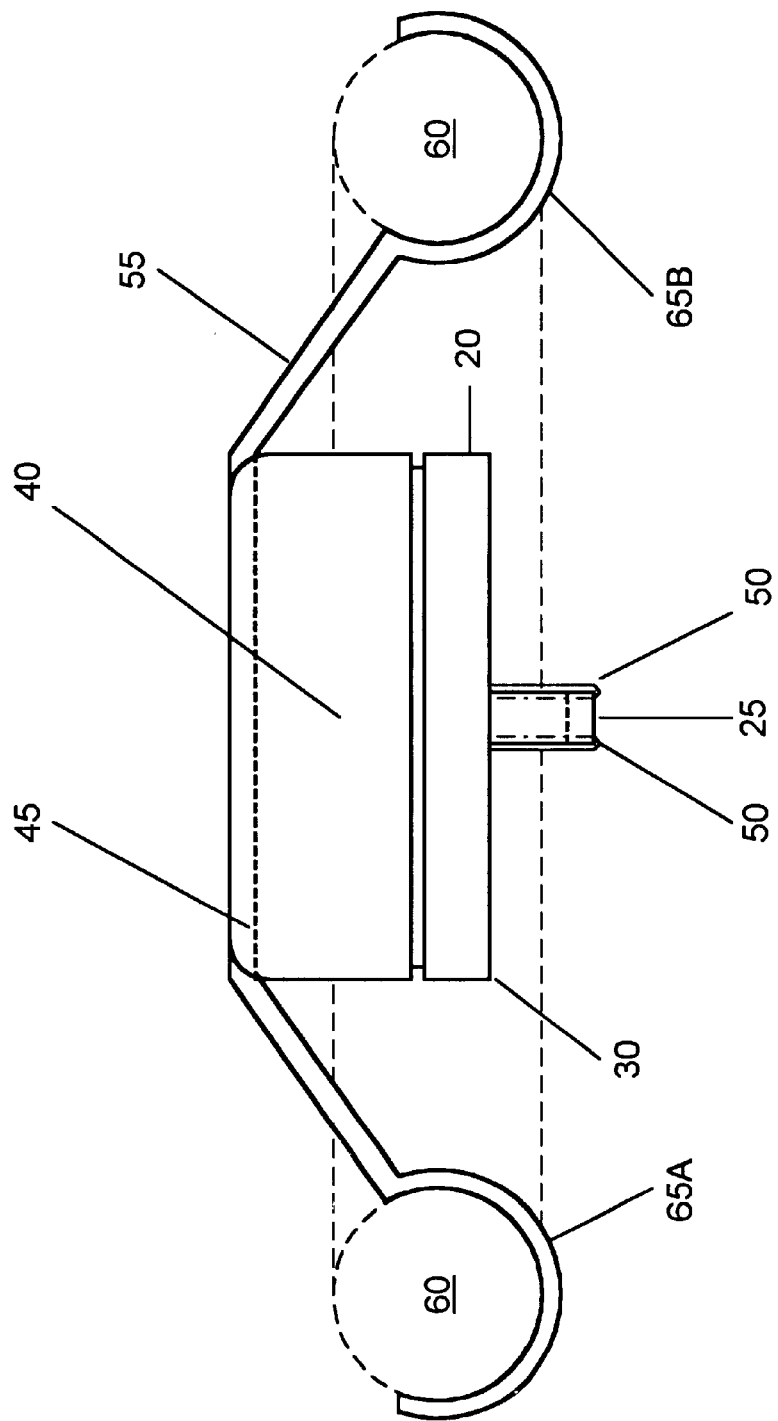
FIG. 2A is a side sectional plan view, shown orthogonal to FIG. 1A, taken along line 2A—2A of FIG. 2, of a first embodiment of the universal electronic fluorescent lamp ballast having a snap-fitted, bat-wing bracket that supports a circular fluorescent tubular lamp.
Figure 2B:
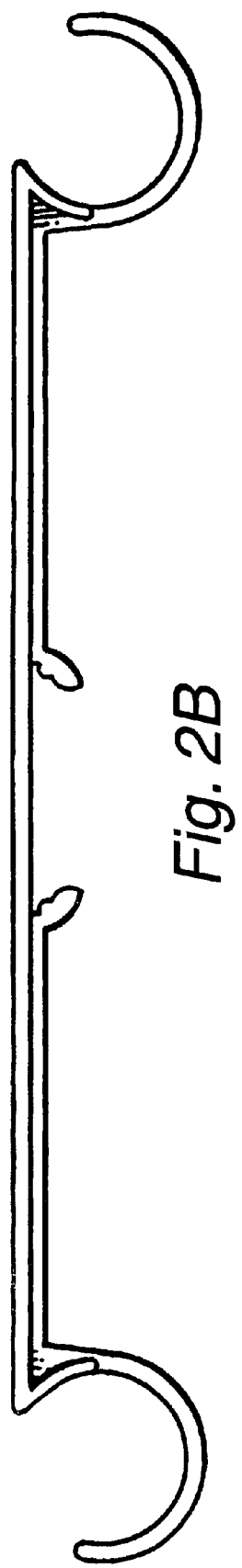
FIG. 2B is a side view of a straight-wing bracket that as an alternative to the bat-wing bracket, supports a circular fluorescent tubular lamp.

As there is shown in FIGS. 2 and 2A, the first embodiment of the present invention comprises an interlocking bat-wing lamp support bracket 55 that engages in the channel 45 on the upper ballast housing 40. The circular fluorescent CircleLite 60 is snap-fitted in the cradled ends 65A and 65B of the bat-wing support bracket 55. (A circle lamp may also be supported on a straight-wing support bracket 55A, depicted in FIG. 2B.) A four-wire cable 70 with a 4-pin receptacle connector, extending from the ballast housing, conducts the AC power to the extreme ends of the circular fluorescent lamp 60.

Figure 3:
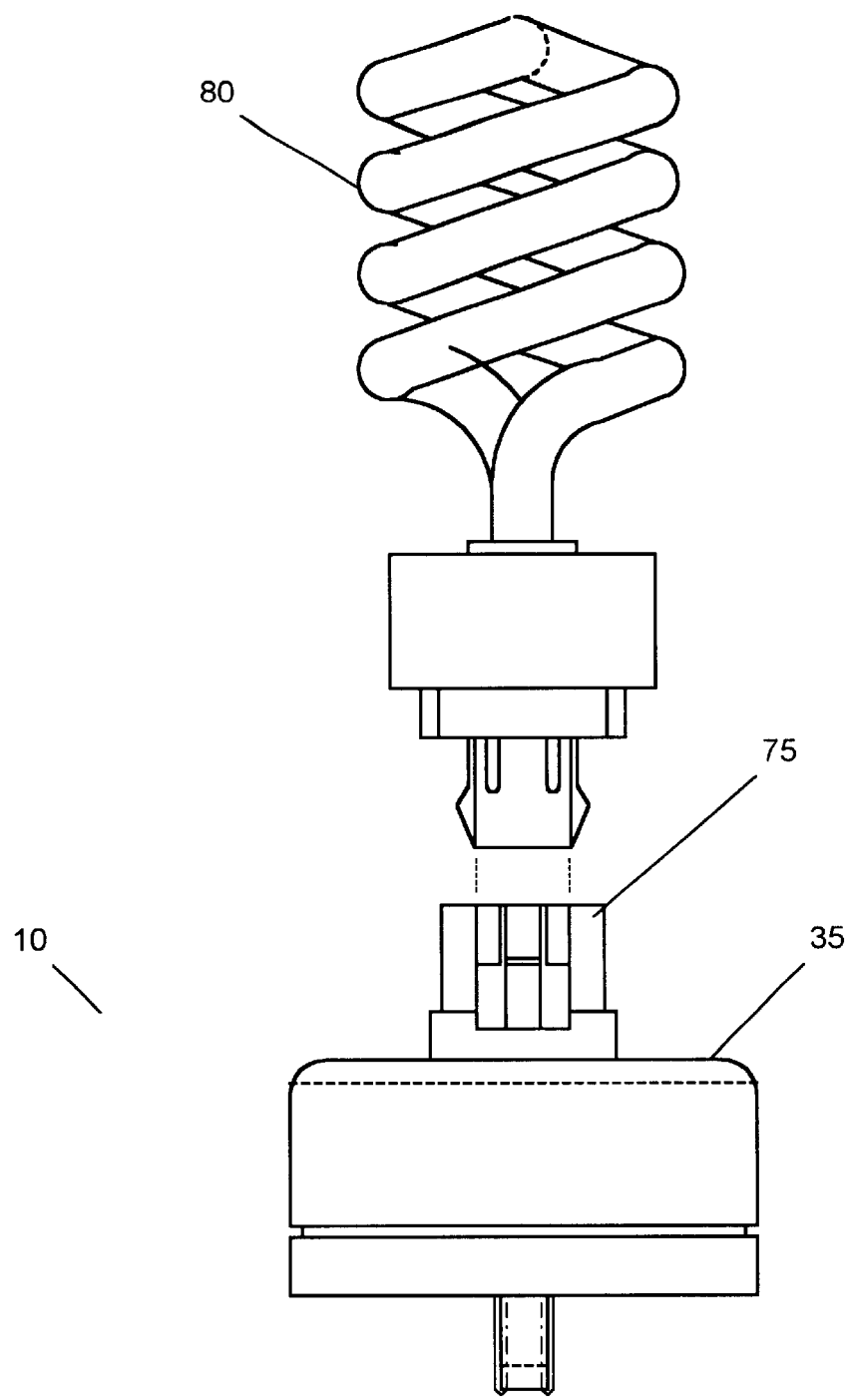
FIG. 3 is a side elevational view of a second embodiment of the universal electronic fluorescent lamp ballast, having a compatible lamp socket on the top surface, for receiving a compact fluorescent SpringLamp.

Turning now to FIG. 3, there is shown in a side elevational view, a second embodiment of the universal modular electronic fluorescent lamp ballast 10. Mounted to the top surface of the upper ballast housing 35 is a 4-pin lamp socket 75 that is compatible for receiving and engaging a laterally twisted compact fluorescent lamp 80, more commonly referred to as a SpringLamp. In this embodiment, no external wires or cables are used to connect to the fluorescent lamp—all four wires are connected internally, within the ballast housing, to the lamp socket 75.

One advantage of using a laterally twisted fluorescent lamp is that it is the shortest lamp known to the fluorescent lamp industry. It provides for minimal light trapping, thereby creating the maximum concentrated light output, and lighting distribution that is closest to the illumination supplied by an incandescent bulb.

Figure 4:
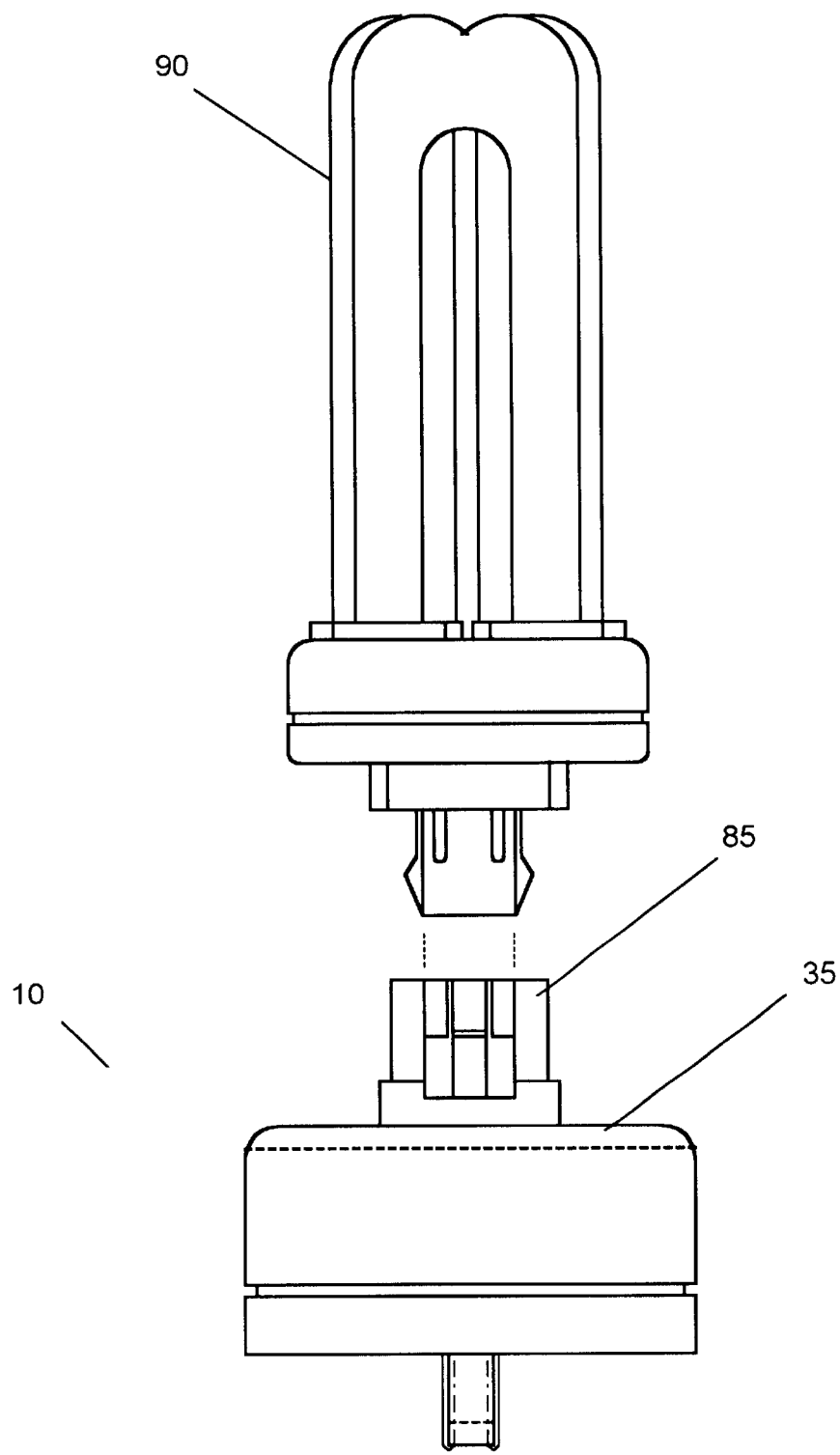
FIG. 4 is a side elevational view of a third embodiment of the universal electronic fluorescent lamp ballast, having a compatible lamp socket on the top surface, for receiving a compact triple biaxial fluorescent lamp.

With reference to FIG. 4, there is shown a side elevational view of a third embodiment of the universal electronic fluorescent lamp plug-in ballast 10. In this embodiment, a 4-pin lamp socket 85 that is compatible for receiving a compact triple biaxial fluorescent lamp 90, is mounted to the top surface 35 of the universal electronic ballast 10. All four wires are connected internally, within the ballast housing, to the lamp socket 85.

Figure 5:
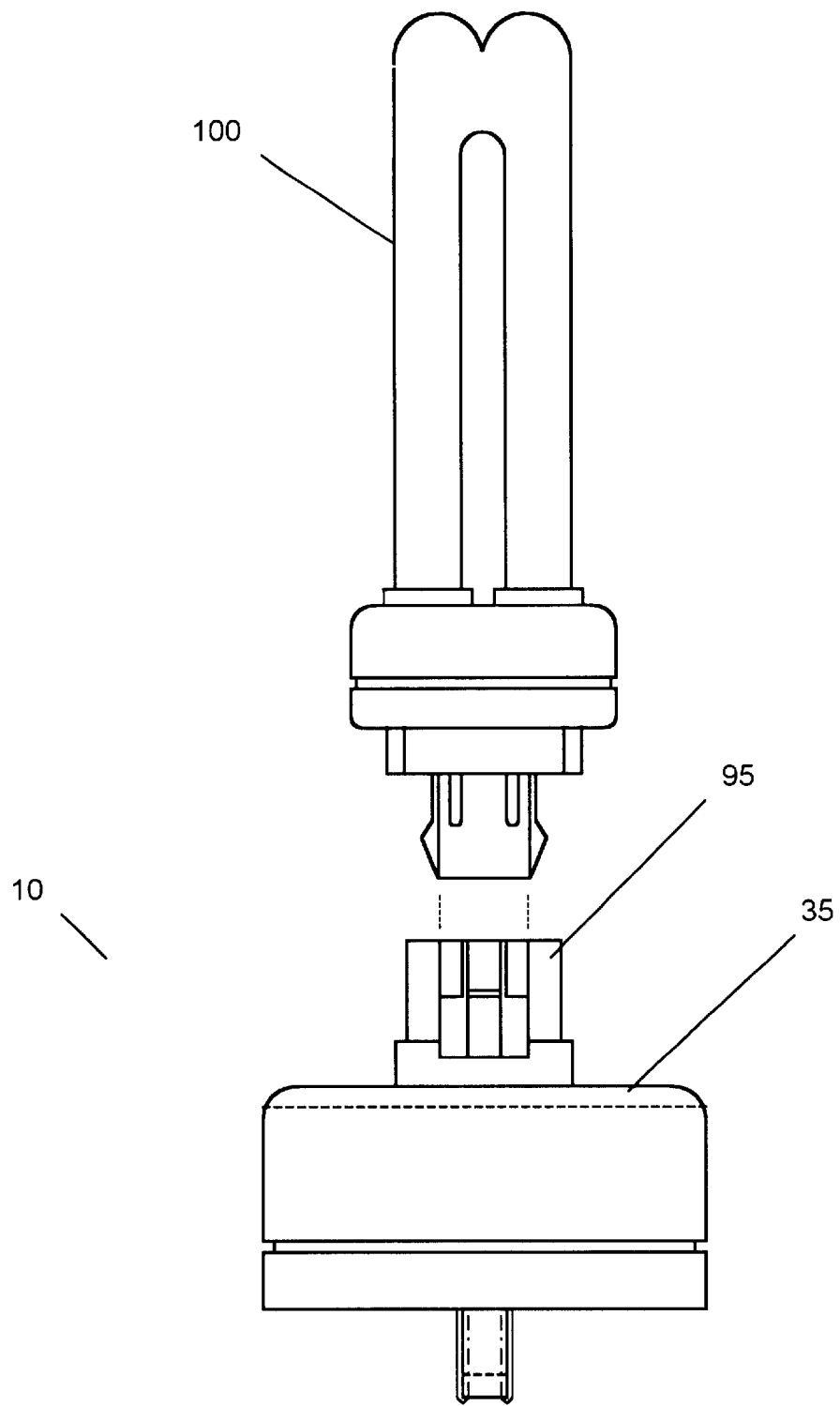
FIG. 5 is a side elevational view of a fourth embodiment of the universal electronic fluorescent lamp ballast, having a compatible lamp socket on the top surface, for receiving a compact double biaxial fluorescent lamp.

FIG. 5 details a side elevational view of a fourth embodiment of the universal replaceable electronic fluorescent lamp ballast 10. A 4-pin lamp socket 95 that is compatible with a compact double biaxial fluorescent lamp 100 mounts to the top surface 35 of the upper ballast housing 40. All connecting wires are concealed within the ballast housing and are thereby protected from abrasion damage.

Figure 6:
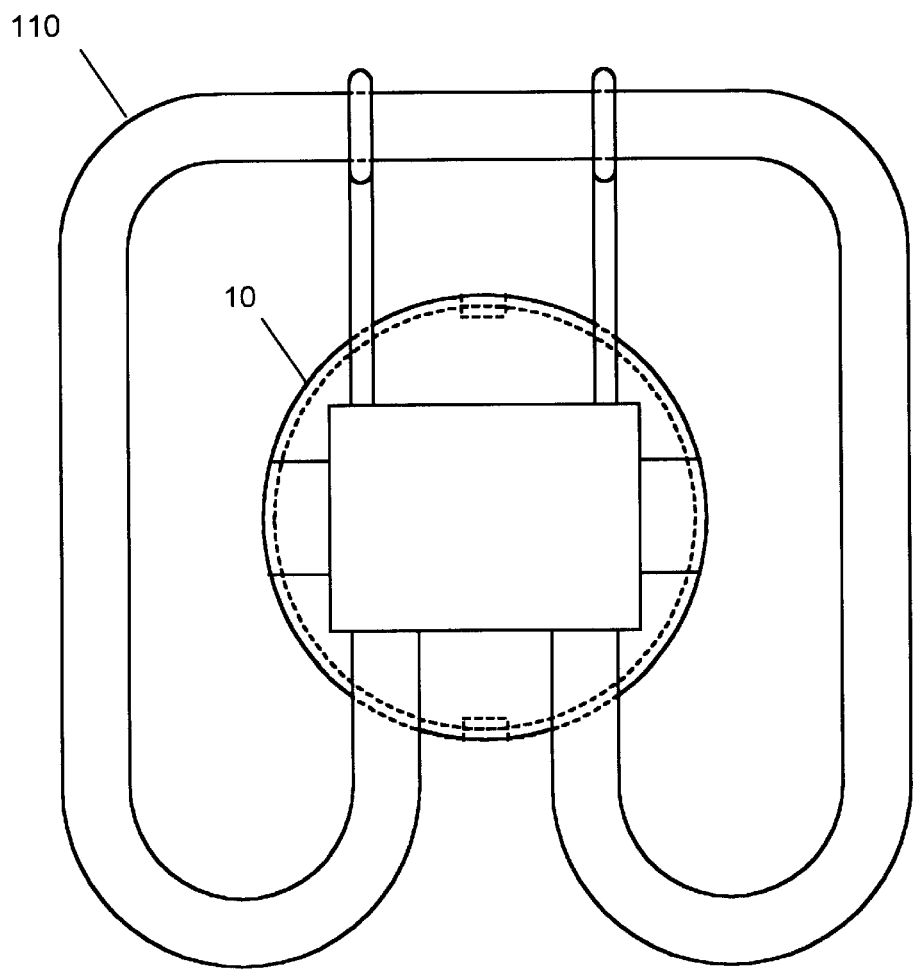
FIG. 6 is a top view of a fifth embodiment of the universal electronic fluorescent lamp ballast, having a compatible lamp socket on the top surface, for receiving a compact 2D fluorescent lamp.
Figure 7:
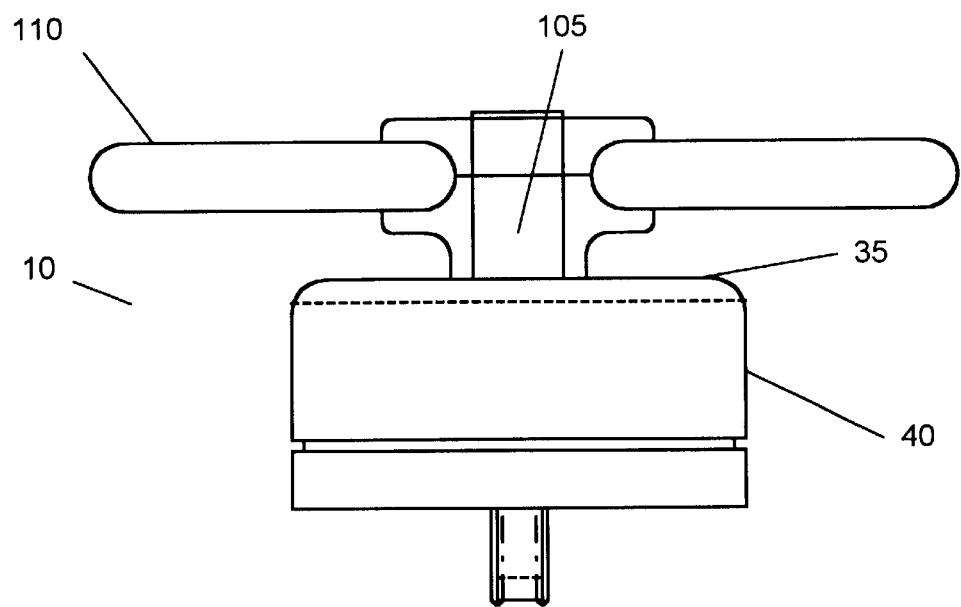
FIG. 7 is a side elevational view of a fifth embodiment of the universal electronic fluorescent lamp ballast, having a compatible lamp socket on the top surface, for receiving a compact 2D fluorescent lamp.

Depicted in FIGS. 6 and 7, is a fifth embodiment of the universal electronic fluorescent lamp ballast 10, showing respectively, the top and side elevations of a 2D fluorescent lamp 110, as used in the present invention. Atop the upper surface 35 of the upper ballast housing 40 is mounted a 4-pin 2D fluorescent lamp socket 105. Contained with the ballast housing are the connecting wires to the 2D lamp socket 105.

There is shown in FIGS. 8A–8F, six conventional lamp bases with their respective socket arrangements that can be used with the universal electronic ballast as alternatively embodied. These lamp bases and keyed sockets are principally for other styles and wattages of compact fluorescent lamps. Each base and socket arrangement is unique so that direct interchangeability cannot be achieved, thereby mandating a single type lamp for use in a given base socket.

Figure 9:
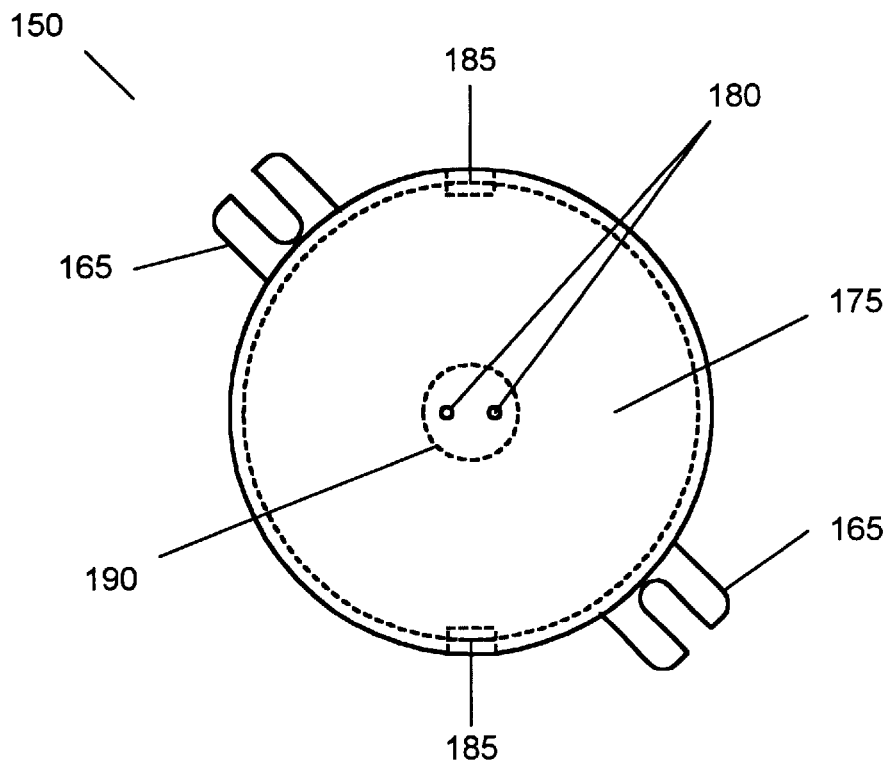
FIG. 9 is a top view of a first embodiment of the universal electronic fluorescent lamp ballast adapter, designed to receive and retain the plug-in universal electronic fluorescent lamp ballast, when mounted in a ceiling or wall mounted electrical fixture.
Figure 10:
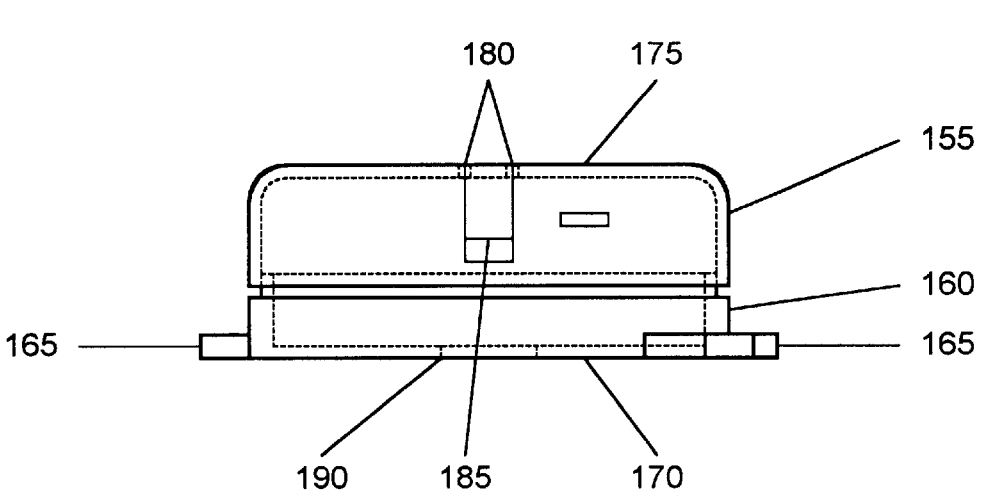
FIG. 10 is a side elevational view of the first embodiment of the universal electronic fluorescent lamp ballast adapter, designed to receive and retain the plug-in universal electronic fluorescent lamp ballast, when mounted in a ceiling or wall mounted electrical fixture.

FIGS. 9 and 10 are a top and side elevational view, respectively, of a first embodiment of the universal electronic fluorescent lamp ballast adapter 150. This adapter is a low profile adapter that is designed to receive and retain the plug-in universal electronic fluorescent lamp ballast 10, when mounted to the mounting plate surface of a ceiling or wall mounted electrical lighting fixture (not shown). Two self-tapping screws, machine screws or rivets secure the adapter 150 to the mounting plate of the electrical lighting fixture.

The adapter 150 is comprised of two mating plastic shells, an upper shell 155 and a lower shell 160. Two mounting feet 165 extend diametrically outward from the lower mounting surface 170 to receive the mounting screws or rivets. Located centrally in the top surface 175 of the upper shell are two pin receptacles 180, to receive the pins 50, found at the bottom surface 30 of the plug-in replaceable electronic fluorescent lamp ballast 10.

The universal modular electronic ballast 10 is retained in the adapter 150 via the two extending projections 25 be inserted and interlocked in the mating receptacles 185. The connecting input power wires pass through the access hole 190 found in the bottom shell 160 of the adapter 150.

Figure 11:
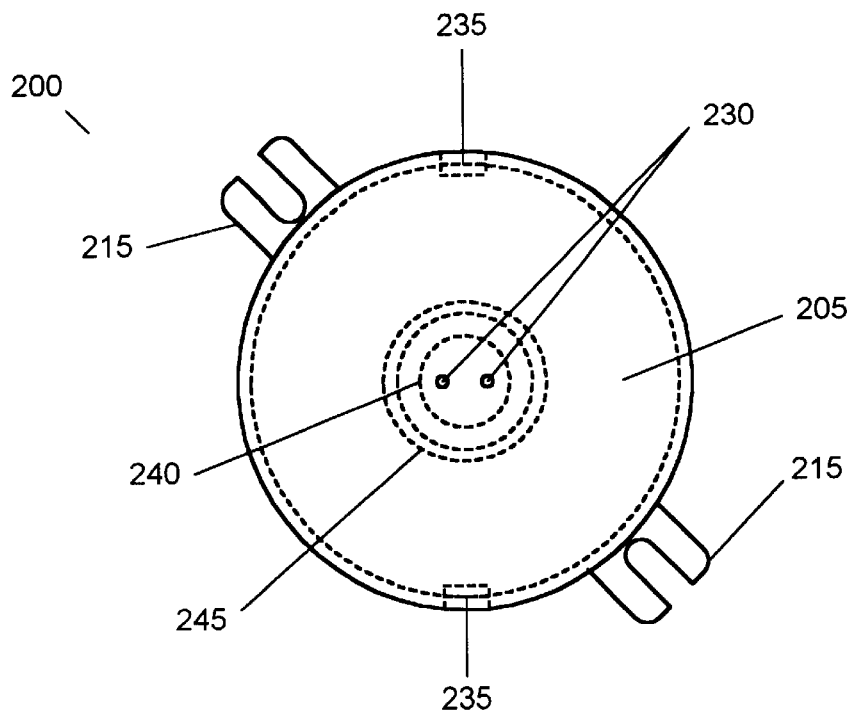
FIG. 11 is a top view of a second embodiment of the universal electronic fluorescent lamp ballast adapter, designed to receive and retain the plug-in universal electronic fluorescent lamp ballast, when mounted in a ceiling or wall mounted electrical fixture, using a screw-lock fastening device.
Figure 12:
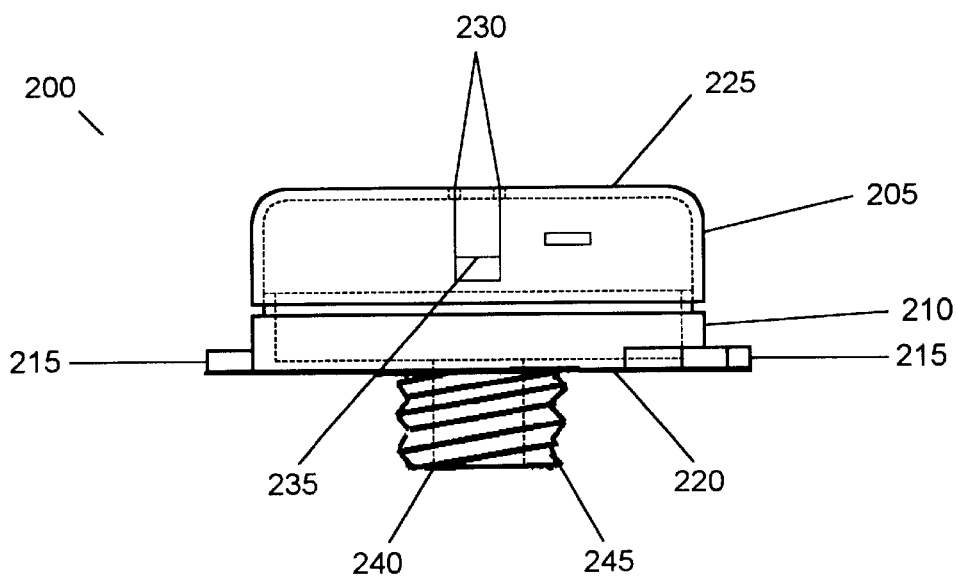
FIG. 12 is a side elevational view of the second embodiment of the universal electronic fluorescent lamp ballast adapter, designed to receive and retain the plug-in universal electronic fluorescent lamp ballast, when mounted in a ceiling or wall mounted electrical fixture, using a screw-lock fastening device.
Figure 12A:
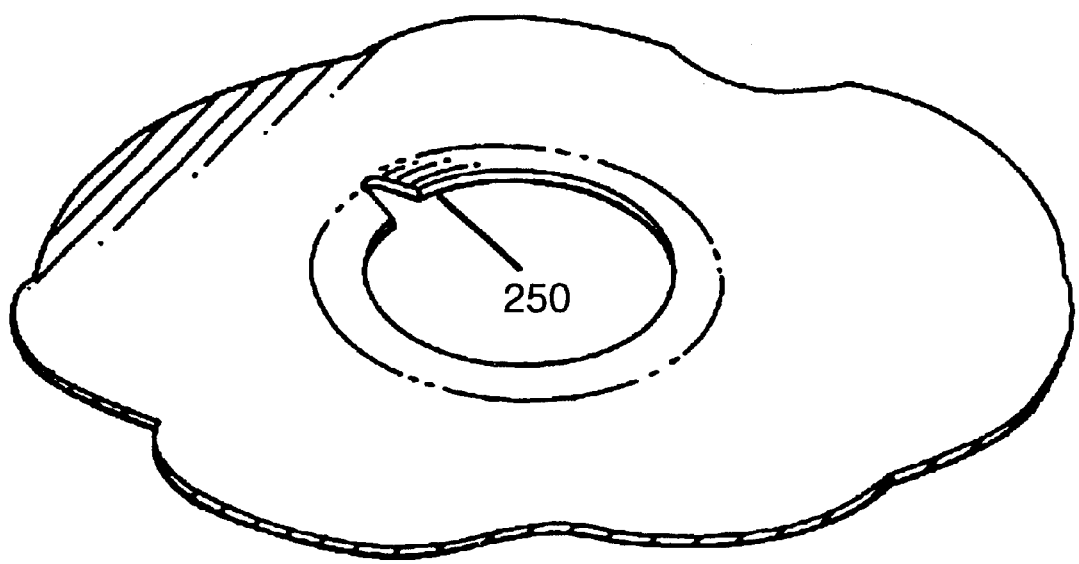
FIG. 12A is a fragmentary view of the receiving aperture in the base plate of an electrical lighting fixture, adapted to receive and engage the treaded boss found at the bottom of the adapter.

FIGS. 11 and 12 are a top and side elevational view, respectively, of a second embodiment of the universal electronic fluorescent lamp ballast adapter 200. This adapter is a low profile adapter that is designed to receive and retain the plug-in universal electronic fluorescent lamp ballast 10. The adapter 200 uses a unique screw-locking device 245 to mount to the mounting plate surface of a ceiling or wall mounted electrical lighting fixture, as shown in FIG. 12A. Alternatively, two self-tapping screws, machine screws or rivets may be used to secure the adapter 200 to the mounting plate of the electrical lighting fixture by using the external feet.

With reference to FIG. 12A, there is shown a fragmentary sectional view illustrating the circular opening 350 for mounting the universal ballast 10. The locking tabs 360 engage with the three ramped threaded portions 365 to provide a secure attachment of the ballast adapter to its respective mounting plate.

The adapter 200 is comprised of two mating plastic shells, an upper shell 205 and a lower shell 210. Two mounting feet 215 extend diametrically outward from the lower mounting surface 220 to receive the mounting screws or rivets. Located centrally in the top surface 225 of the upper shell are two pin receptacles 230, to receive the pins 50, found at the bottom surface 30 of the plug-in replaceable electronic fluorescent lamp ballast 10.

The universal modular electronic ballast 10 is retained in the adapter 200 via the two extending projections 25 that are inserted and interlocked in the mating receptacles 235. The connecting input power wires pass through the access hole 240 found in the bottom shell 210 of the adapter 200.

Figure 13:
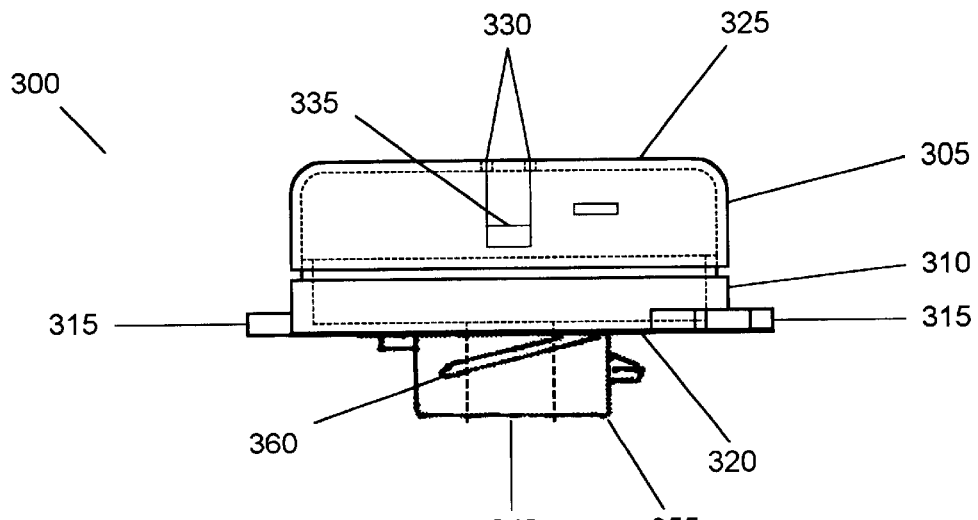
FIG. 13 is a side elevational view of a third embodiment of the universal electronic fluorescent lamp ballast adapter, that is designed to receive and retain the plug-in universal electronic fluorescent lamp ballast, when mounted in a ceiling or wall mounted electrical fixture, using a twist-lock fastening device.
Figure 14:
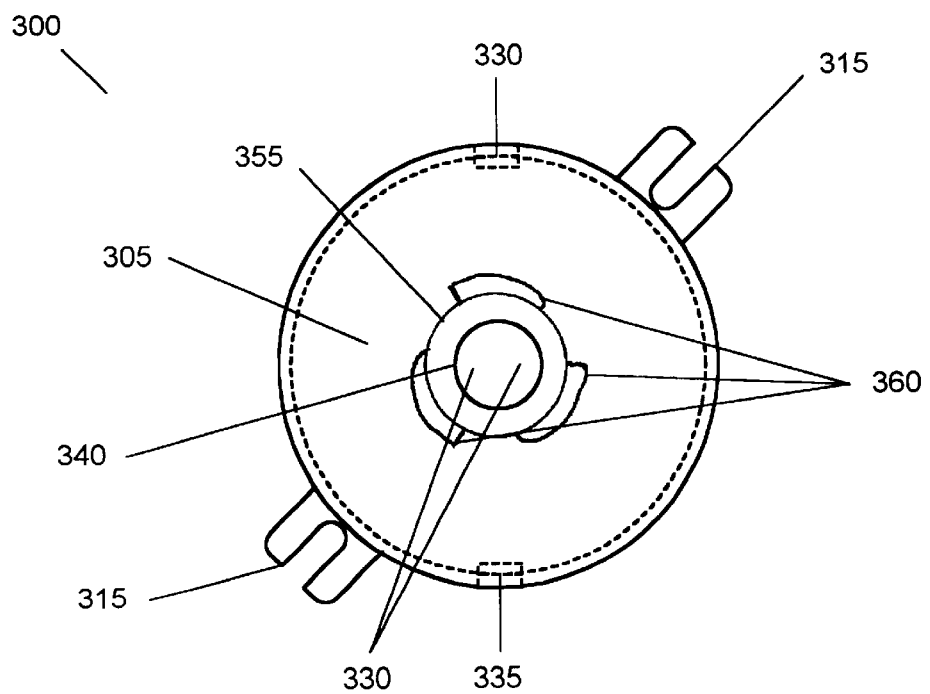
FIG. 14 is a bottom view of the third embodiment of the universal electronic fluorescent lamp ballast adapter, that is designed to receive and retain the plug-in universal electronic fluorescent lamp ballast, when mounted in a ceiling or wall mounted electrical fixture, using a twist-lock fastening device.
Figure 14A:
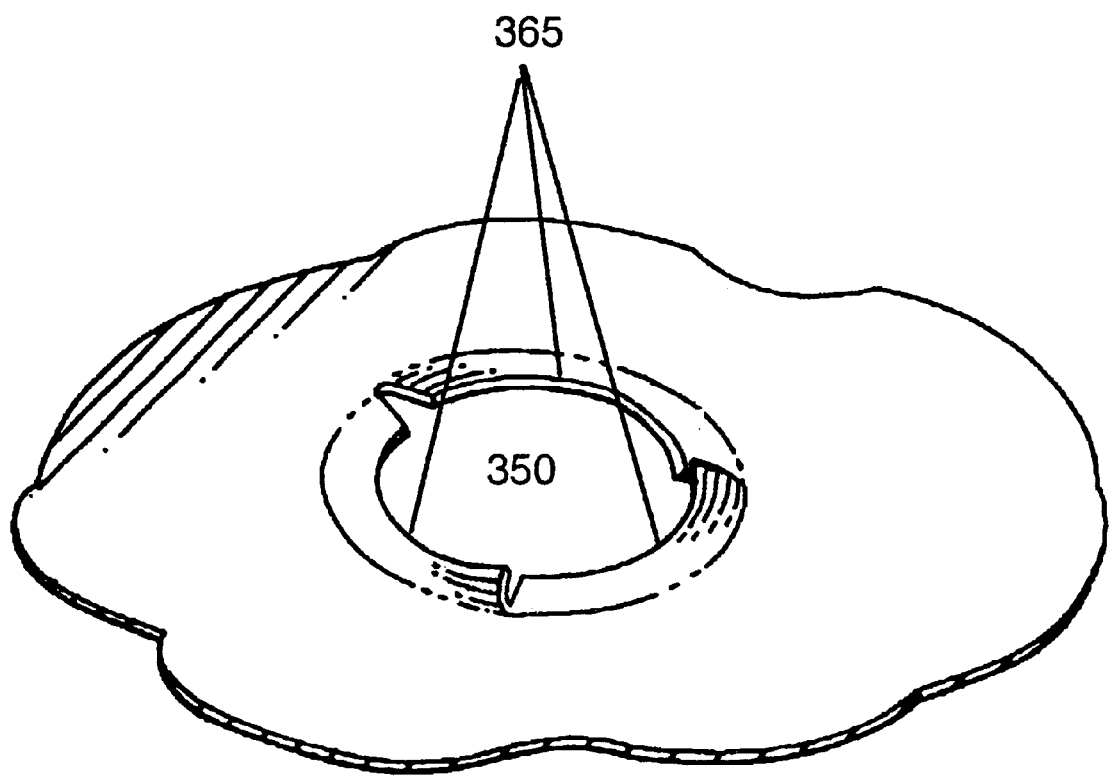
FIG. 14A is a fragmentary view of the receiving aperture in the base plate of an electrical lighting fixture, adapted to receive and engage the twist-lock vaned boss found at the bottom of the adapter.

FIGS. 13 and 14 are a top and side elevational view, respectively, of a third embodiment of the universal electronic fluorescent lamp ballast adapter 300. This adapter is a low profile adapter that is designed to receive and retain the plug-in universal electronic fluorescent lamp ballast 10. The adapter 300 uses a unique twist-locking vaned boss 355 to mount to the mounting plate surface of a ceiling or wall mounted electrical lighting fixture, as shown in FIG. 14A. Alternatively, two self-tapping screws, machine screws or rivets may be used to secure the adapter 300 to the mounting plate of the electrical lighting fixture by using the external feet.

The adapter 300 is comprised of two mating plastic shells, an upper shell 305 and a lower shell 310. The two mounting feet 315 extend diametrically outward from the lower mounting surface 320 to receive the mounting screws or rivets. Located centrally in the top surface 325 of the upper shell are two pin receptacles 330, to receive the pins 50, found at the bottom surface 30 of the plug-in replaceable electronic fluorescent lamp ballast 10.

The universal modular electronic ballast 10 is retained in the adapter 300 via the two extending projections 25 that are inserted and interlocked in the mating receptacles 335. The connecting input power wires pass through the access hole 340 found in the bottom shell 310 of the adapter 300.

Figure 15:
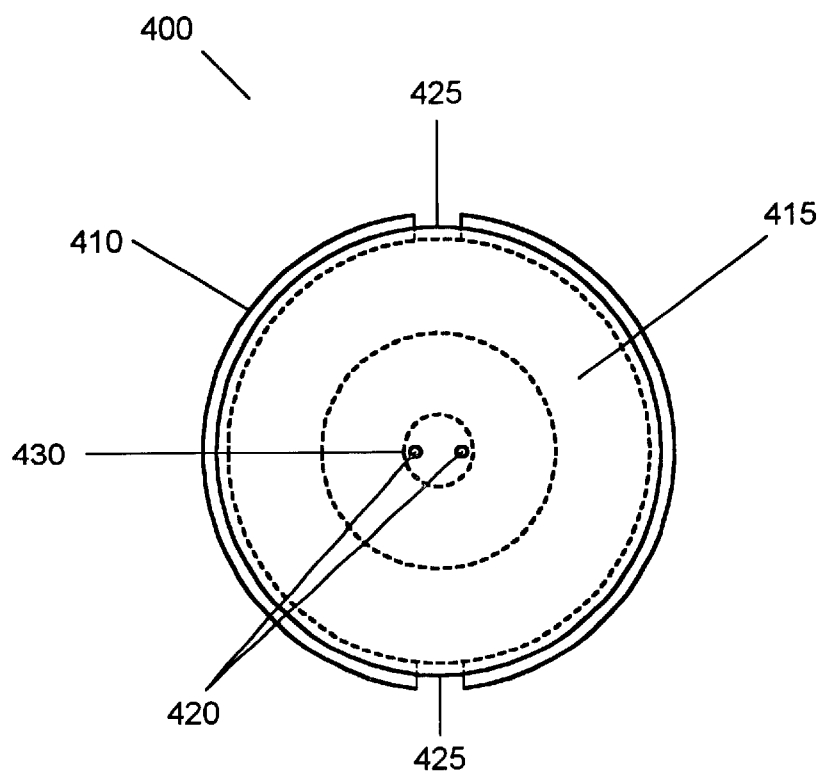
FIG. 15 is a top view of a fourth embodiment of the universal electronic fluorescent lamp ballast adapter, that is designed to receive and retain the plug-in universal electronic fluorescent lamp ballast, when used in either a table or a floor lamp.
Figure 16:
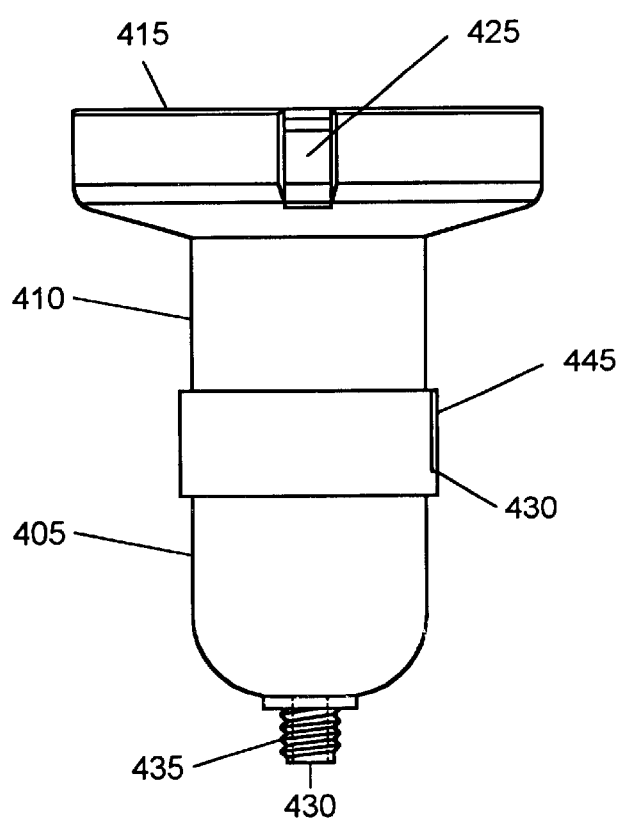
FIG. 16 is a side elevational view of a fourth embodiment of the universal electronic fluorescent lamp ballast adapter, that is designed to receive and retain the plug-in universal electronic fluorescent lamp ballast, when used in either a table or a floor lamp.

FIGS. 15 and 16 detail a top and side elevational view of a fourth embodiment of the universal electronic fluorescent lamp ballast adapter, that is designed to receive and retain the plug-in universal electronic fluorescent lamp ballast, when used in either a table or a floor lamp.

This table/floor fluorescent adapter 400 is comprised of three molded components. They are: a plastic lower snap-fitting shell 405, a plastic upper-flanged body 410 that receives the lower shell and a top surfaced cover plate 415. Centrally located in the top cover plate 415 are two pin receptacles 420 that accept the input power pins 50 from the modular plug-in electronic ballast 10. This cover plate 415 is snap-fitted into the flanged portion of the main upper body 410.

The universal modular electronic ballast 10 is retained in the adapter 400 via the two extending projections 25 that are inserted and interlocked in the mating receptacles 425. The connecting input power wires pass through the access hole 430 in the threaded nipple 435 found in the bottom shell 405 of the adapter 400.

The fourth adapter 400, having a local switch operating capability, has a switch access opening 440 that gives height to a table or floor lamp for a coordinated appearance with its accoutrement lampshade.

In the fifth embodiment of the present invention, the entire assembly is identical to the fourth embodiment, except that the switch opening 440 is covered with a local switch opening cover 445 to provide for a remote switching capability. This adapter also gives height to a table or floor lamp for a coordinated appearance with its accoutrement lampshade.

It should be appreciated and understood that the preceding detailed description is for example only. Other modifications, deviations, and improvements may be made without departing from the true spirit of the present invention.

I claim:

1. A universal replaceable ballast for a fluorescent lamp, comprising:

a bottom housing with a pair of power pins for conducting input power to the ballast and an at least one fluorescent lamp; and, an adapter having a pair of pin receptacles to receive the ballast power pins; the adapter including a threaded boss and having a flat surface surrounding the boss, for use in a low profile lighting fixture with a flat base plate including an essentially circular, threaded receiving aperture, whereby the adapter boss is rotatably drawn flat abutting the surface of the base plate in a binding frictional engagement to removably secure the adapter to said base plate; and, wherein the ballast is replaceable as a plug-in to the adapter without any necessity for tools, a technician or dismantling the fixture, floor or table lamp.

2. The universal replaceable ballast for a fluorescent lamp according to claim 1, ballast further comprising, a top housing with a connecting means in communication with the at least one fluorescent lamp.

3. The universal replaceable ballast for a fluorescent lamp according to claim 2, further comprising a means for retaining the ballast on the adapter.

4. The universal replaceable ballast for a fluorescent lamp according to claim 3, wherein the adapter includes a local operating switch and a height extension for a table or floor lamp to provide a coordinated appearance with a lampshade.

5. The universal replaceable ballast for a fluorescent lamp, according to claim 3, wherein the adapter includes a remote operating switch and a height extension for a table or floor lamp to provide a coordinated appearance with a lampshade.

6. The universal replaceable ballast for a fluorescent lamp according to claim 3, the at least one fluorescent lamp comprising a circle lamp.

7. The universal replaceable ballast for a fluorescent lamp according to claim 3, the at least one fluorescent lamp comprising a compact fluorescent springlamp.

8. The universal replaceable ballast for a fluorescent lamp according to claim 3, the at least one fluorescent lamp comprising a compact double biaxial fluorescent lamp.

9. The universal replaceable ballast for a fluorescent lamp according to claim 3, the at least one fluorescent lamp comprising a compact triple biaxial fluorescent lamp.

10. The universal replaceable ballast for a fluorescent lamp according to claim 3, the at least one fluorescent lamp comprising a 2D fluorescent lamp.

11. A fluorescent lamp ballast replaceable without rewiring a ballast input or output, comprising:

an adapter including a two pin socket wired to a power source;

a ballast with a 2-pin plug insertable in the adapter socket and a 4-pin connector to conduct power to a fluorescent lamp, whereby the ballast is easily replaceable by an inexperienced person by unplugging the ballast from the adapter and replacing it with a substitute ballast; and, wherein the ballast is compatible with a plurality of alternative fluorescent lamps selected from the group consisting of a circle lamp, a compact fluorescent lamp, a double biaxial fluorescent lamp a triple biaxial fluorescent lamp and 2D fluorescent lamp.

12. The fluorescent lamp ballast replaceable without rewiring a ballast input or output according to claim 11, comprising an electronic ballast with an instant start design.

13. The fluorescent lamp ballast replaceable without rewiring a ballast input or output according to claim 11, comprising an electronic ballast with an rapid start design.

14. A universal replaceable ballast for a fluorescent lamp, comprising:

a top housing having a grooved channel to receive an interlocking support bracket and a 4-pin connector in communication with a fluorescent lamp; a bottom housing with a pair of power ping for conducting input power to the ballast and the fluorescent lamp, and two locking projections extending down from a lower surface thereof; and, an adapter having a pair of mating receptacles to receive the locking projections and to retain the universal ballast on the adapter and a pair of pin receptacles to receive the ballast bottom housing power pins, wherein the ballast is plugged into the adapter with the pair of power pins and the fluorescent lamp is plugged to the ballast with the 4-pin connector, and wherein the ballast bottom housing locking projections are inserted in the adapter mating receptacles, whereby the ballast is easily replaced as a plug-in and lock-in to the adapter without any necessity for tools, a technician or dismantling the fixture, floor or table lamp.

15. The universal replaceable ballast for a fluorescent lamp according to claim 14, further comprising a means for mounting the adapter to a light fixture, a floor or table lamp.

16. The universal replaceable ballast for a fluorescent lamp according to claim 15, wherein the adapter includes a base portion with extending tabs, whereby said adapter is securable using fasteners through the tabs.

17. The universal replaceable ballast for a fluorescent lamp according to claim 6, the adapter having an engaging component that is insertable into a recess of a light fixture base plate and rotatable therein for attachment.

18. The universal replaceable ballast for a fluorescent lamp according to claim 17, the adapter having a vaned boss for use in a low profile lighting fixture the base plate including an essentially circular receiving, aperture including a plurality of ramped depressions, wherein said adapter is securable to the base plate by engagement the vanes with the depressions by rotation of the adapter, whereby said adapter is rotatably drawn against the plate in a binding frictional engagement.

19. The universal replaceable ballast for a fluorescent lamp according to claim 17, the adapter including a threaded boss and having a flat surface surrounding the boss, for use in a low profile lighting fixture the base plate including an essentially circular, threaded receiving aperture, whereby the adapter boss is rotatably drawn flat abutting the surface of the base plate in a binding frictional engagement to removably secure the adapter to said base plate.

20. The universal replaceable ballast for a fluorescent lamp according to claim 14, further comprising a bat-wing support bracket mounted on the top ballast housing by engagement in said grooved channel of the top housing for suspending the circle lamp near the ballast.

21. The universal replaceable ballast for a fluorescent lamp according to claim 14, further comprising a straight-wing support bracket mounted on the top ballast housing with engagement in said grooved channel of the top housing for suspending the circle lamp near the ballast.

* * * * *